US010230627B2

(12) United States Patent
Ren

(10) Patent No.: US 10,230,627 B2
(45) Date of Patent: Mar. 12, 2019

(54) SERVICE PATH ALLOCATION METHOD, ROUTER AND SERVICE EXECUTION ENTITY

(71) Applicant: HUAWEI TECHNOLOGIES CO., LTD., Shenzhen (CN)

(72) Inventor: Jian Ren, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 15/003,833

(22) Filed: Jan. 22, 2016

(65) Prior Publication Data
US 2016/0142290 A1 May 19, 2016

Related U.S. Application Data

(63) Continuation of application No. PCT/CN2013/080135, filed on Jul. 25, 2013.

(51) Int. Cl.
H04L 12/725 (2013.01)
H04L 12/751 (2013.01)
(Continued)

(52) U.S. Cl.
CPC ........ *H04L 45/306* (2013.01); *H04L 12/4633* (2013.01); *H04L 12/6418* (2013.01);
(Continued)

(58) Field of Classification Search
None
See application file for complete search history.

(56) References Cited

U.S. PATENT DOCUMENTS 8,094,575 B1 * 1/2012 Vadlakonda .......... H04L 45/123
370/252
2004/0136356 A1 7/2004 Kuo et al.
(Continued)

FOREIGN PATENT DOCUMENTS

CN 1710904 A 12/2005
CN 1859307 A 11/2006
(Continued)

OTHER PUBLICATIONS

European Office Action dated Jan. 25, 2017 in corresponding European Patent Application No. 13890051.9.
(Continued)

*Primary Examiner* — Kodzovi Acolatse
(74) *Attorney, Agent, or Firm* — Staas & Halsey LLP

(57) ABSTRACT

Embodiments of the present invention provide a service path allocation method, a router, and a service execution entity. In the method provided in the embodiments, a router obtains a user identifier and IP 5-tuple information after receiving a packet, queries for a corresponding target service processing path according to the user identifier and the IP 5-tuple information, and, after encapsulating the service packet, sends the service packet to the first-hop service execution entity in the service path for corresponding service processing. For a different service flow, the executed target service processing path is different. In the method provided in the embodiments, different service paths can be allocated to different service flows according to a user's customization and a service type, thereby implementing dynamic allocation of the service paths and increasing a utilization ratio of network resources.

12 Claims, 6 Drawing Sheets

(51) Int. Cl.
*H04L 12/64* (2006.01)
*H04L 12/46* (2006.01)
*H04L 12/26* (2006.01)
*H04L 12/741* (2013.01)

(52) U.S. Cl.
CPC ............ *H04L 43/028* (2013.01); *H04L 45/02* (2013.01); *H04L 45/30* (2013.01); *H04L 45/745* (2013.01)

(56) References Cited

U.S. PATENT DOCUMENTS

| | | | |
|---|---|---|---|
| 2007/0086340 A1 | 4/2007 | Li | |
| 2007/0159963 A1* | 7/2007 | Qing | H04L 41/0668 370/228 |
| 2009/0041038 A1* | 2/2009 | Martini | H04L 45/50 370/401 |
| 2010/0235877 A1* | 9/2010 | Hu | H04L 63/0227 726/1 |
| 2014/0119374 A1* | 5/2014 | Balasubramanian | H04L 67/28 370/392 |
| 2014/0233385 A1* | 8/2014 | Beliveau | H04L 47/122 370/235 |

FOREIGN PATENT DOCUMENTS

| | | |
|---|---|---|
| CN | 102401695 A | 4/2012 |
| CN | 102571602 A | 7/2012 |
| CN | 103067294 A | 4/2013 |
| EP | 1 793 537 A1 | 6/2007 |
| EP | 2 182 694 A1 | 5/2010 |
| JP | 2007-181056 | 7/2007 |
| WO | WO 03/096206 A1 | 11/2003 |

OTHER PUBLICATIONS

International Search Report dated Apr. 30, 2014, in corresponding International Application No. PCT/CN2013/080135.
International Search Report dated Apr. 30, 2014 in corresponding International Patent Application No. PCT/CN2013/080135.
Chinese Office Action dated Aug. 5, 2015 in corresponding Chinese Patent Application No. 201380001112.2.
Extended European Search Report dated Mar. 9, 2016 in corresponding European Patent Application No. 13890051.9.

\* cited by examiner

SERVICE PATH ALLOCATION METHOD, ROUTER AND SERVICE EXECUTION ENTITY

CROSS-REFERENCE TO RELATED APPLICATIONS

This application is a continuation of International Application No. PCT/CN2013/080135, filed on Jul. 25, 2013, which is incorporated by reference in it entirety.

TECHNICAL FIELD

The present invention relates to the field of communications technologies, and in particular, to a service path allocation method, a router, and a service execution entity.

BACKGROUND

In third-generation network technologies, a service router supports multiple services, for example, services such as layer-4 firewall filtering, wide area network optimization control (WOC), Network Address Translation (NAT), and a firewall (FW), and each router has a corresponding control system, where the control system is responsible for information exchange between a router and its neighboring router, system configuration, system management, and the like.

In the prior art, after entering a service router, all service flows undergo same service processing. This method, however, leads to a waste of resources and a decrease of processing efficiency of a router.

SUMMARY

Embodiments of the present invention provide a service path allocation method, a router, and a service execution entity, which can execute different service processing paths for different service flows, thereby improving efficiency of using resources.

A first aspect of the present invention provides a service path allocation method, including:

receiving, by a router, a service packet of a user, and obtaining a user identifier and Internet Protocol IP 5-tuple information according to the service packet, where the IP 5-tuple information includes information about a source IP address, a destination IP address, a source port, a destination port, and a communications protocol:

querying, by the router, a service path table for a target service processing path corresponding to the user identifier and the 5-tuple information, where the target service path includes information about at least one service execution entity, and each service execution entity is configured to perform one type of service processing on the service packet; and sending, by the router according to the service path after encapsulation is performed on the service packet, an encapsulated service packet to the first-hop service execution entity in the service path for corresponding service processing, where the encapsulated service packet includes the user identifier.

In a first possible implementation manner of the first aspect of the present invention, the service path table includes a level-1 service path table and a level-2 service path table, where the level-1 service path table includes a plurality of first service processing paths and the level-2 service path table includes a plurality of second service processing paths:

the first service processing path includes information about a service execution entity configured to perform layer L4 processing on the service packet, and an identifier indicating whether to perform layer L7 processing; and the second service processing path includes information about a service execution entity configured to perform layer L7 processing on the service packet.

In a second possible implementation manner of the first aspect of the present invention, the querying, by the router, a service path table for a service processing path corresponding to the user identifier and the 5-tuple information includes:

querying, by the router, the level-1 service path table for a first service processing path corresponding to the user identifier and the 5-tuple information; where if the corresponding first service processing path includes an identifier of not performing layer L7 processing, the corresponding first service processing path is the target service processing path.

In a third possible implementation manner of the first aspect of the present invention, the querying, by the router, a service path table for a service processing path corresponding to the user identifier and the 5-tuple information further includes:

if the corresponding first service processing path includes an identifier of performing layer L7 processing, the last-hop service execution entity in the corresponding first service processing path is further configured to forward the packet to a deep packet inspection service execution entity after performing corresponding service processing on the service packet, and the deep packet inspection service execution entity performs a deep packet inspection on the packet to parse and obtain a service type identifier of the service packet.

In a fourth possible implementation manner of the first aspect of the present invention, the querying, by the router, a service path table for a service processing path corresponding to the user identifier and the 5-tuple information further includes:

if the corresponding first service processing path includes the identifier of performing layer L7 processing, querying, by the router, the level-2 service path table for a second service processing path corresponding to the user identifier, the 5-tuple information, and a service type identifier, where the corresponding first service processing path and the corresponding second service processing path are the target service processing paths.

With reference to the third and fourth possible implementation manners of the first aspect of the present invention, in a fifth possible implementation manner of the first aspect of the present invention, if the corresponding first service processing path includes the identifier of performing layer L7 processing, the second service processing path further includes information about a service execution entity configured to perform layer L4 processing on the service packet.

With reference to the first aspect of the present invention and the first to fifth possible implementation manners of the first aspect, in a sixth possible implementation manner of the first aspect of the present invention, before the querying, by the router, a service path table for a target service processing path corresponding to the user identifier and the 5-tuple information, the method further includes:

receiving, by the router, the service path table delivered by a controller.

A second aspect of the present invention provides a service path allocation method, including:

receiving, by a service execution entity, a service packet, where the service packet includes a user identifier and IP 5-tuple information, or includes a user identifier, IP 5-tuple information, and a service type identifier, where the IP 5-tuple information includes information about a source IP address, a destination IP address, a source port, a destination port, and a communications protocol;

after performing corresponding service processing on the service packet, querying, by the service execution entity, a service path table for a target service processing path corresponding to the user identifier and the 5-tuple information, or querying a service path table for a target service processing path corresponding to the user identifier, the 5-tuple information, and the service type identifier, where the target service path includes information about at least one service execution entity, and each service execution entity is configured to perform one type of service processing on the service packet, and sending, by the service execution entity, a packet that has undergone the service processing to a next-hop service execution entity in the target service processing path for corresponding service processing.

In a first possible implementation manner of the second aspect of the present invention, the receiving, by a service execution entity, a service packet includes:

receiving, by the service execution entity, the service packet sent by a router, or receiving the service packet sent by a previous-hop service execution entity in the target service processing path.

In a second possible implementation manner of the second aspect of the present invention, the service path table includes a level-1 service path table and a level-2 service path table, where the level-1 service path table includes a plurality of first service processing paths and the level-2 service path table includes a plurality of second service processing paths;

the first service processing path includes information about a service execution entity configured to perform layer L4 processing on the service packet, and an identifier indicating whether to perform layer L7 processing; and the second service processing path includes information about a service execution entity configured to perform layer L7 processing on the service packet.

In a third possible implementation manner of the second aspect of the present invention, the querying a service path table for a target service processing path corresponding to the user identifier and the 5-tuple information includes:

if the service execution entity is included in the first service processing path, querying, by the service execution entity, the level-1 service path table for a first service processing path corresponding to the user identifier and the 5-tuple information.

In a fourth possible implementation manner of the second aspect of the present invention, if the corresponding first service processing path includes an identifier of not performing layer L7 processing, the corresponding first service processing path is the target service processing path.

In a fifth possible implementation manner of the second aspect of the present invention, if the service execution entity is the last-hop node in the first service processing path, after the querying, by the service execution entity, the level-1 service path table for a first service processing path corresponding to the user identifier and the 5-tuple information, the method further includes:

if the corresponding first service processing path includes an identifier of performing layer L7 processing, forwarding, by the service execution entity, the packet to a deep packet inspection service execution entity, and the deep packet inspection service execution entity performs a deep packet inspection on the packet to parse and obtain the service type identifier of the service packet; and querying, by the deep packet inspection service execution entity, the level-2 service path table for a second service processing path corresponding to the user identifier, the 5-tuple information, and the service type identifier, where the corresponding first service processing path and the corresponding second service processing path are the target service processing paths.

With reference to the second aspect of the present invention and the first to fifth possible implementation manners of the second aspect, in a sixth possible implementation manner of the second aspect of the present invention, before the querying a service path table for a target service processing path corresponding to the user identifier and the 5-tuple information, or querying a service path table for a target service processing path corresponding to the user identifier, the 5-tuple information, and the service type identifier, the method further includes:

receiving, by the service execution entity, the service path table delivered by a controller.

A third aspect of the present invention provides a router, including:

a receiving module, configured to receive a service packet of a user, and obtain a user identifier and Internet Protocol IP 5-tuple information according to the service packet, where the IP 5-tuple information includes information about a source IP address, a destination IP address, a source port, a destination port, and a communications protocol;

a target service path query module, configured to query a service path table for a target service processing path corresponding to the user identifier and the 5-tuple information, where the target service path includes information about at least one service execution entity, and each service execution entity is configured to perform one type of service processing on the service packet; and a service encapsulating module, configured to encapsulate the service packet, where an encapsulated service packet includes the user identifier; and a sending module, configured to send, according to the service path, the encapsulated packet to the first-hop service execution entity in the service path for corresponding service processing.

In a first possible implementation manner of the third aspect of the present invention, the service path table includes a level-1 service path table and a level-2 service path table, where the level-1 service path table includes a plurality of first service processing paths and the level-2 service path table includes a plurality of second service processing paths;

the first service processing path includes information about a service execution entity configured to perform layer IA processing on the service packet, and an identifier indicating whether to perform layer L7 processing; and the second service processing path includes information about a service execution entity configured to perform layer L7 processing on the service packet.

In a second possible implementation manner of the third aspect of the present invention, the target service path query module is specifically configured to:

query the level-1 service path table for a first service processing path corresponding to the user identifier and the 5-tuple information, where if the corresponding first service processing path includes an identifier of not performing layer L7 processing, the corresponding first service processing path is the target service processing path.

In a third possible implementation manner of the third aspect of the present invention, if the corresponding first service processing path includes an identifier of performing layer L7 processing, the last-hop service execution entity in the corresponding first service processing path is further configured to forward the packet to a deep packet inspection service execution entity after performing corresponding service processing on the service packet, and the deep packet inspection service execution entity performs a deep packet inspection on the packet to parse and obtain a service type identifier of the service packet.

In a fourth possible implementation manner of the third aspect of the present invention, the target service path query module is specifically configured to:

if the corresponding first service processing path includes the identifier of performing layer L7 processing, query the level-2 service path table for a second service processing path corresponding to the user identifier, the 5-tuple information, and a service type identifier, where the corresponding first service processing path and the corresponding second service processing path are the target service processing paths.

With reference to the third and fourth possible implementation manners of the third aspect of the present invention, in a fifth possible implementation manner of the third aspect of the present invention, if the corresponding first service processing path includes the identifier of performing layer L7 processing, the second service processing path further includes information about a service execution entity configured to perform layer L4 processing on the service packet.

With reference to the third aspect of the present invention and the first to fifth possible implementation manners of the third aspect, in a sixth possible implementation manner of the third aspect of the present invention, the receiving module is further configured to:

receive the service path table delivered by a controller.

A fourth aspect of the present invention provides a service execution entity, including:

a receiving module, configured to receive a service packet, where the service packet includes a user identifier and IP 5-tuple information, or includes a user identifier, IP 5-tuple information, and a service type identifier, where the IP 5-tuple information includes information about a source IP address, a destination IP address, a source port, a destination port, and a communications protocol;

a service processing module, configured to perform corresponding service processing on the service packet;

a service path query module, configured to, after the service processing module performs the corresponding service processing on the service packet, query a service path table for a target service processing path corresponding to the user identifier and the 5-tuple information, or query a service path table for a target service processing path corresponding to the user identifier, the 5-tuple information, and the service type identifier, where the target service path includes information about at least one service execution entity, and each service execution entity is configured to perform one type of service processing on the service packet; and a sending module, configured to send a packet that has undergone the service processing performed by the service processing module to a next-hop service execution entity in the target service processing path for corresponding service processing.

In a first possible implementation manner of the fourth aspect of the present invention, the receiving module is specifically configured to:

receive the service packet sent by a router, or receive the service packet sent by a previous-hop service execution entity in the target service processing path.

In a second possible implementation manner of the fourth aspect of the present invention, the service path table includes a level-1 service path table and a level-2 service path table, where the level-1 service path table includes a plurality of first service processing paths and the level-2 service path table includes a plurality of second service processing paths;

the first service processing path includes information about a service execution entity configured to perform layer L4 processing on the service packet, and an identifier indicating whether to perform layer L7 processing; and the second service processing path includes information about a service execution entity configured to perform layer L7 processing on the service packet.

In a third possible implementation manner of the fourth aspect of the present invention, if the service execution entity is included in the first service processing path, the service path query module is specifically configured to:

query the level-1 service path table for a first service processing path corresponding to the user identifier and the 5-tuple information.

In a fourth possible implementation manner of the fourth aspect of the present invention, if the corresponding first service processing path includes an identifier of not performing layer L7 processing, the corresponding first service processing path is the target service processing path.

In a fifth possible implementation manner of the fourth aspect of the present invention, if the service execution entity is the last-hop node in the first service processing path and the corresponding first service processing path includes an identifier of performing layer L7 processing, the sending module forwards the packet to a deep packet inspection service execution entity, and the deep packet inspection service execution entity performs a deep packet inspection on the packet to parse and obtain the service type identifier of the service packet; and the deep packet inspection service execution entity queries the level-2 service path table for a second service processing path corresponding to the user identifier, the 5-tuple information, and the service type identifier, where the corresponding first service processing path and the corresponding second service processing path are the target service processing paths.

With reference to the second aspect of the present invention and the first to fifth possible implementation manners of the fourth aspect, in a sixth possible implementation manner of the fourth aspect of the present invention, the receiving module is further configured to:

receive the service path table delivered by a controller.

A fifth aspect of the present invention provides a router, including:

a receiver, configured to receive a service packet of a user, and obtain a user identifier and Internet Protocol IP 5-tuple information according to the service packet, where the IP 5-tuple information includes information about a source IP address, a destination IP address, a source port, a destination port, and a communications protocol;

a processor, configured to query a service path table for a target service processing path corresponding to the user identifier and the 5-tuple information, where the target service path includes information about at least one service execution entity, and each service execution entity is configured to perform one type of service processing on the service packet; and a sender, configured to send, according to the service path after encapsulation is performed on the service packet, an encapsulated service packet to the first-hop service execution entity in the service path for corresponding service processing, where the encapsulated service packet includes the user identifier.

In a first possible implementation manner of the fifth aspect of the present invention, the service path table includes a level-1 service path table and a level-2 service path table, where the level-1 service path table includes a plurality of first service processing paths and the level-2 service path table includes a plurality of second service processing paths:

the first service processing path includes information about a service execution entity configured to perform layer L4 processing on the service packet, and an identifier indicating whether to perform layer L7 processing; and the second service processing path includes information about a service execution entity configured to perform layer L7 processing on the service packet.

In a second possible implementation manner of the fifth aspect of the present invention, the processor is specifically configured to query the level-1 service path table for a first service processing path corresponding to the user identifier and the 5-tuple information, where if the corresponding first service processing path includes an identifier of not performing layer L7 processing, the corresponding first service processing path is the target service processing path.

In a third possible implementation manner of the fifth aspect of the present invention, if the corresponding first service processing path includes an identifier of performing layer L7 processing, the last-hop service execution entity in the corresponding first service processing path is further configured to forward the packet to a deep packet inspection service execution entity after performing corresponding service processing on the service packet, and the deep packet inspection service execution entity performs a deep packet inspection on the packet to parse and obtain a service type identifier of the service packet.

In a fourth possible implementation manner of the fifth aspect of the present invention, if the corresponding first service processing path includes an identifier of performing layer L7 processing, the processor is specifically configured to:

query the level-2 service path table for a second service processing path corresponding to the user identifier, the 5-tuple information, and a service type identifier, where the corresponding first service processing path and the corresponding second service processing path are the target service processing paths.

With reference to the third and fourth possible implementation manners of the fifth aspect of the present invention, in a fifth possible implementation manner of the fifth aspect of the present invention, if the corresponding first service processing path includes the identifier of performing layer L7 processing, the second service processing path further includes information about a service execution entity configured to perform layer L4 processing on the service packet.

With reference to the fifth aspect of the present invention and the first to fifth possible implementation manners of the fifth aspect, in a sixth possible implementation manner of the fifth aspect of the present invention, the receiver is further configured to receive the service path table delivered by a controller.

A sixth aspect of the present invention provides a service execution entity, including:

a receiver, configured to receive a service packet, where the service packet includes a user identifier and IP 5-tuple information, or includes a user identifier, IP 5-tuple information, and a service type identifier, where the IP 5-tuple information includes information about a source IP address, a destination IP address, a source port, a destination port, and a communications protocol;

a processor, configured to: after performing corresponding service processing on the service packet, query a service path table for a target service processing path corresponding to the user identifier and the 5-tuple information, or query a service path table for a target service processing path corresponding to the user identifier, the 5-tuple information, and the service type identifier, where the target service path includes information about at least one service execution entity, and each service execution entity is configured to perform one type of service processing on the service packet; and a sender, configured to send a packet that has undergone the service processing performed by the processor to a next-hop service execution entity in the target service processing path for corresponding service processing.

In a first possible implementation manner of the sixth aspect of the present invention, the receiver is specifically configured to:

receive the service packet sent by a router, or receive the service packet sent by a previous-hop service execution entity in the target service processing path.

In a second possible implementation manner of the sixth aspect of the present invention, the service path table includes a level-1 service path table and a level-2 service path table, where the level-1 service path table includes a plurality of first service processing paths and the level-2 service path table includes a plurality of second service processing paths;

the first service processing path includes information about a service execution entity configured to perform layer L4 processing on the service packet, and an identifier indicating whether to perform layer L7 processing; and the second service processing path includes information about a service execution entity configured to perform layer L7 processing on the service packet.

In a third possible implementation manner of the sixth aspect of the present invention, if the service execution entity is included in the first service processing path, the processor is specifically configured to query the level-1 service path table for a first service processing path corresponding to the user identifier and the 5-tuple information.

In a fourth possible implementation manner of the sixth aspect of the present invention, if the corresponding first service processing path includes an identifier of not performing layer L7 processing, the corresponding first service processing path is the target service processing path.

In a fifth possible implementation manner of the sixth aspect of the present invention, if the service execution entity is the last-hop node in the first service processing path and the corresponding first service processing path includes an identifier of performing layer L7 processing, the sender is specifically configured to:

forward the packet to a deep packet inspection service execution entity, and the deep packet inspection service execution entity performs a deep packet inspection on the packet to parse and obtain the service type identifier of the service packet, where the deep packet inspection service execution entity queries the level-2 service path table for a second service processing path corresponding to the user identifier, the 5-tuple information, and the service type identifier, where the corresponding first service processing path and the corresponding second service processing path are the target service processing paths.

With reference to the sixth aspect of the present invention and the first to fifth possible implementation manners of the sixth aspect, in a sixth possible implementation manner of the sixth aspect of the present invention, the receiver is further configured to:

receive the service path table delivered by a controller.

In the method provided in the embodiments, after receiving a packet, a router queries for a corresponding target service processing path according to a user identifier and IP 5-tuple information, and, after performing layer L2 and layer L3 processing on the service packet, sends a processed service packet to the first-hop service execution entity in a service path for corresponding service processing. For a different service flow, an executed service processing path is different. In the method provided in the embodiments, different service paths can be allocated to different service flows according to a user's customization and a service type, thereby implementing dynamic allocation of the service paths and increasing a utilization ratio of network resources.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
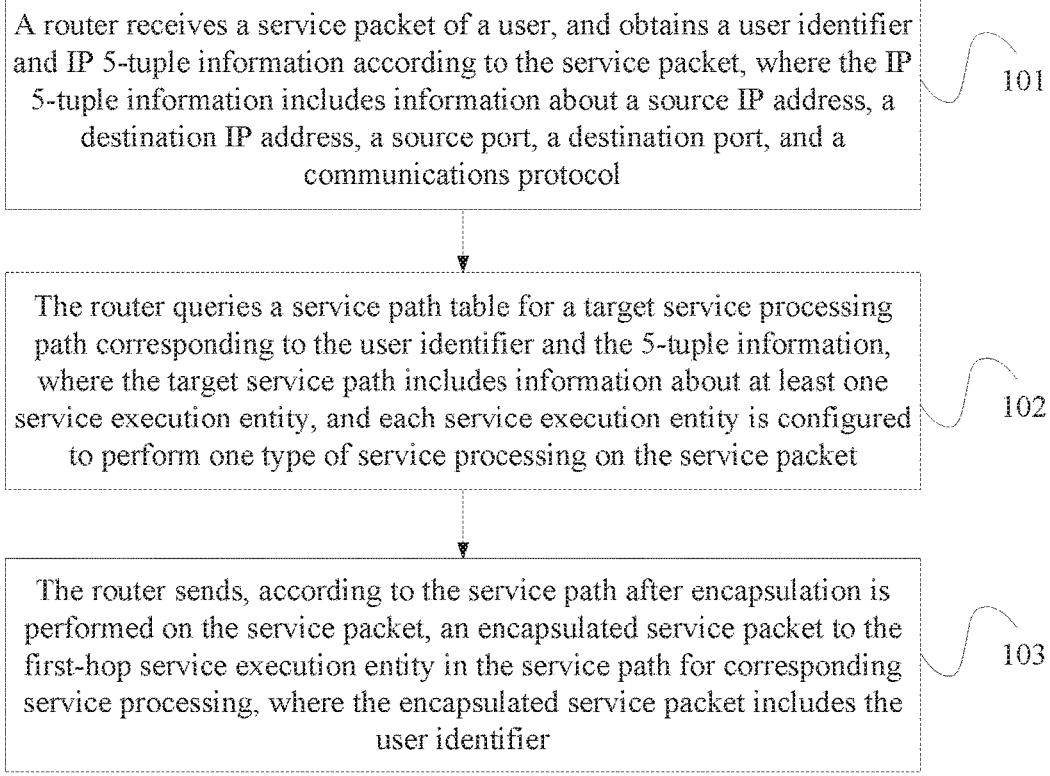
FIG. 1 is a flowchart of a service path allocation method according to a first embodiment of the present invention.

FIG. 1 is a flowchart of a service path allocation method according to a first embodiment of the present invention. As shown in FIG. 1, the method provided in this embodiment is executed by a service path allocation apparatus. The apparatus is integrated into a router. In a local area network, the router is an egress router arranged in the local area network, and communication between all packets located in the local area network and an external network must be preformed by using the router. In a metropolitan area network, the router is arranged on a network convergence layer. The convergence layer is an information convergence point of buildings or residential areas, and is a network device that connects an access layer and a core layer. All packets of the buildings or the residential areas pass through the router, which provides data convergence\transmission\management\distribution processing and the like for the access layer. The router may also be arranged at an egress interface of a backbone network. In this embodiment, the router primarily provides a function of diversion, and diverts a flow to a specified service processing entity or a specified service path according to different services. The method provided in this embodiment includes the following steps:

Step 101: A router receives a service packet of a user, and obtains a user identifier and IP 5-tuple information according to the service packet, where the IP 5-tuple information includes information about a source IP address, a destination IP address, a source port, a destination port, and a communications protocol.

The user identifier can uniquely determine one user, and the user identifier and the IP 5-tuple information can uniquely determine one service flow. In this embodiment, one user identifier can not only identify one terminal, but can also identify a plurality of terminals. For example, all computers inside a company use a same user identifier.

That the router obtains a user identifier and IP 5-tuple information according to the service packet is specifically that the router determines the user identifier according to an ingress interface of the received service packet, where one ingress interface is corresponding to one user, and the service packet carries the IP 5-tuple information, and the router parses the service packet to obtain the IP 5-tuple information. After obtaining the user identifier, the router makes the user identifier be carried in the packet, so that a subsequent service execution entity performs service processing on the packet according to the user identifier.

Step 102: The router queries a service path table for a target service processing path corresponding to the user identifier and the 5-tuple information, where the target service path includes information about at least one service execution entity, and each service execution entity is configured to perform one type of service processing on the service packet.

After receiving the service packet of the user, the router queries, according to the user identifier and the IP 5-tuple information, the service path table for the target service processing path corresponding to the user, the user identifier, and the 5-tuple information, where the target service path includes information about at least one service execution entity, and each service execution entity is configured to perform one type of service processing on the service packet, and the information about the service execution entity includes an IP address of the service execution entity, a service executed by the service execution entity, and other content. The service path table may be generated by a controller and delivered to the router and each service processing entity, and may also be generated by a service orchestration layer.

In this embodiment, the router and all service processing entities are managed in a centralized manner by means of controller management. First, the user customizes a service such as Network Address Translation (NAT), a layer-4 filtering firewall, web URL (URL) filtering, application filtering, application control, application acceleration, and IPSec tunneling. The controller allocates a user identifier to the user, generates a service path table according to the service customized by the user, and delivers the service path table to the router and each service processing entity, or the controller delivers the service path table to a flow switch and the flow switch delivers the service path table to the router and each service processing entity. In this embodiment, the controller is further responsible for updating the service path table. After a user cancels a certain service, a service path corresponding to the user changes. Therefore, the controller needs to re-generate the service path table. After the service path table is updated, the controller may deliver the service path table proactively, and may also deliver the service path table passively, that is, may deliver the service path table after a request sent by the router is received.

Step 103: The router sends, according to the service path after encapsulation is performed on the service packet, an encapsulated service packet to the first-hop service execution entity in the service path for corresponding service processing, where the encapsulated service packet includes the user identifier.

In this embodiment, the router encapsulates the obtained user identifier into a packet, and sends, according to a found service path, an encapsulated packet to the first-hop service execution entity in the service path for corresponding service processing.

Understandably, when the user does not customize a service, no service path table customized by the user is stored on the router, and the router performs layer L2 and layer L3 forwarding processing on the packet and forwards the packet to a destination terminal or a next router according to a default path.

In the method provided in this embodiment, after receiving a packet, a router queries for a corresponding target service processing path according to a user identifier and IP 5-tuple information, encapsulates the user identifier into the packet, and sends the packet to the first-hop service execution entity in a service path for corresponding service processing. For a different service flow, an executed service processing path is different. In the method provided in this embodiment, different service paths can be allocated to different service flows according to a user's customization and a service type, thereby implementing dynamic allocation of the service paths and increasing a utilization ratio of network resources.

Figure 2:
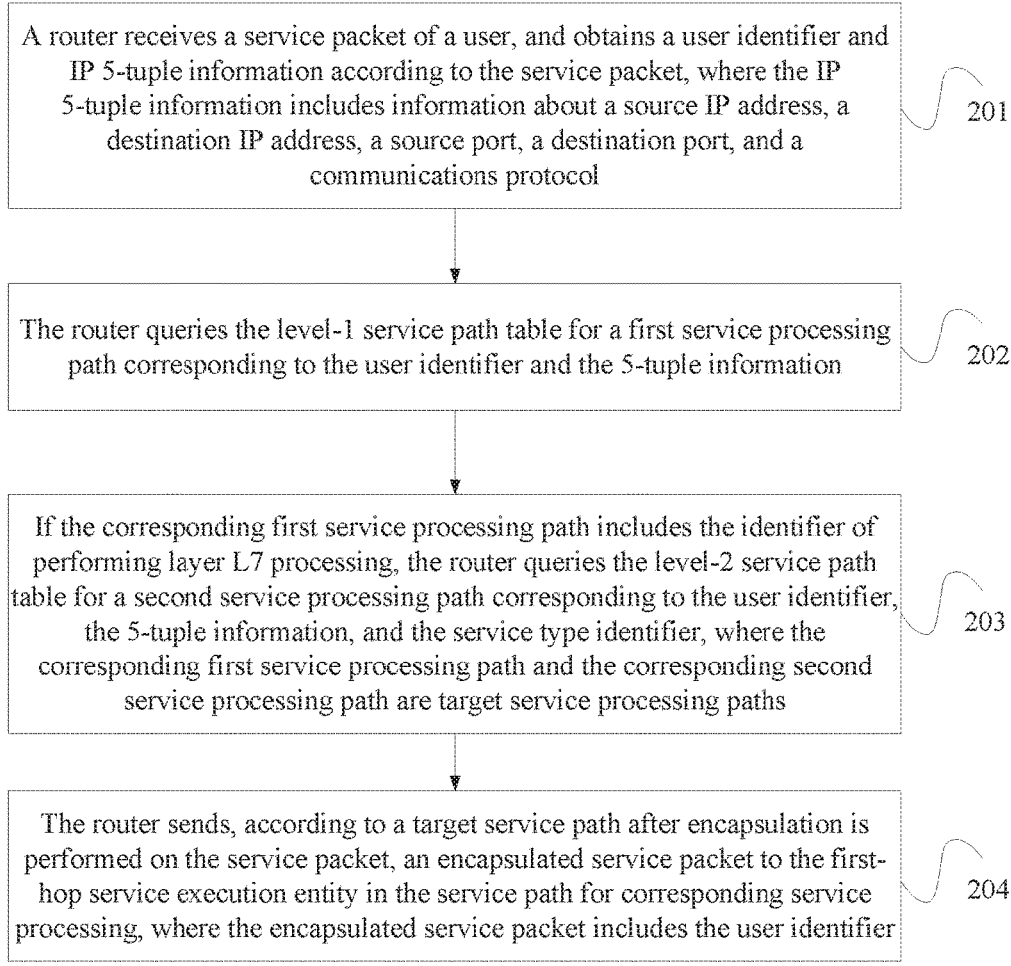
FIG. 2 is a flowchart of a service path allocation method according to a second embodiment of the present invention.

FIG. 2 is a flowchart of a service path allocation method according to a second embodiment of the present invention. On a basis of the first embodiment, in this embodiment, a service path table is divided into a level-1 service path table and a level-2 service path table. The level-1 service path table includes information about a service execution entity for performing layer L4 processing on a service packet, and the level-1 service path table includes information about a service execution entity for performing layer L7 processing on the service packet. During execution, the service execution entity executes a level-1 service path first and then executes a level-2 service path. The following describes the service path allocation method in detail. As shown in FIG. 2, the service path processing method provided in this embodiment includes the following steps:

Step 201: A router receives a service packet of a user, and obtains a user identifier and IP 5-tuple information according to the service packet, where the IP 5-tuple information includes information about a source IP address, a destination IP address, a source port, a destination port, and a communications protocol.

Step 202: The router queries the level-1 service path table for a first service processing path corresponding to the user identifier and the 5-tuple information.

In this embodiment, a service path table includes a level-1 service path table and a level-2 service path table, where the level-1 service path table includes a plurality of first service processing paths and the level-2 service path table includes a plurality of second service processing paths. The first service processing path includes information about a service execution entity configured to perform layer L4 processing on the service packet, and an identifier indicating whether to perform layer L7 processing; and the second service processing path includes information about a service execution entity configured to perform layer L7 processing on the service packet. For each user, a controller generates a service path corresponding to the user according to information about a customized service of each user, and delivers the service path to the router. For different users, the service processing path may include only a first service processing path or a second service processing path, and may include both the first service processing path and the second service processing path. The router saves the service processing path into a corresponding service path table, that is, saves the first service processing path into the level-1 service path table and saves the second service processing path into the level-2 service path table.

After receiving the service packet, the router first quires the level-1 service path table according to the user identifier and the 5-tuple information that are included in the packet, so as to check whether a first service processing path corresponding to the user identifier and the 5-tuple information exists in the level-1 service path table; and, if the corresponding first service processing path exists, the router further determines whether an identifier of performing layer L7 processing on the packet exists in the first service processing path. If the corresponding first service processing path includes an identifier of not performing layer L7 processing, the corresponding first service processing path is a target service processing path. If the corresponding first service processing path includes an identifier of performing layer L7 processing, it indicates that the layer-7 service processing needs to be further performed on the packet, and the router needs to further query a second service processing path and use the first service processing path and the second service processing path as target service paths, where the second service processing path includes information about a service execution entity for performing layer L7 processing on the service packet. When the service execution entity processes the service packet, the first service processing path is executed first, and then the second service processing path is executed, that is, the layer L4 processing is performed on the service packet first and then the layer L7 layer processing is performed. When the first service processing path or the second service processing path is executed, the execution is performed sequentially according to an execution sequence of services in the first service processing path or the second service processing path.

Step 203: If the corresponding first service processing path includes the identifier of performing layer L7 processing, the router queries the level-2 service path table for a second service processing path corresponding to the user identifier, the 5-tuple information, and the service type identifier, where the corresponding first service processing path and the corresponding second service processing path are target service processing paths.

If the first service processing path corresponding to the service packet includes the identifier of performing layer L7 processing, the last-hop service execution entity in the corresponding first service processing path is further configured to forward the packet to a deep packet inspection service execution entity after performing corresponding service processing on the service packet, and the deep packet inspection service execution entity performs a deep packet inspection (DPI) on the packet to parse and obtain a service type identifier of the service packet, and makes the service type identifier be carried in the service packet, so that the service execution entity in the second service processing path queries the level-2 service path table for the corresponding second service processing path according to the user identifier, the 5-tuple information, and the service type identifier of the service packet. The deep packet inspection service execution entity queries the level-2 service path table for the corresponding second service processing path according to the service type identifier obtained by means of inspection, the user identifier, and the 5-tuple information, and sends the service packet to the first-hop service execution entity in the second service processing path according to the second service processing path.

In this embodiment, the second service processing path needs to be determined according to the user identifier, the 5-tuple information, and a service type of the service packet because the service processing for packet service flows corresponding to different applications customized by a same user varies. For example, for a user whose user identifier is 1, as regards packets corresponding to a QQ application, application filtering is performed first and then NAT translation is performed; and, as regards Hypertext Transfer Protocol (HTTP) packets, URL filtering is performed first and then NAT translation is performed. For Xunlei, downloaded resources are generally video streams, and speed limitation is required for the video streams. Therefore, for Xunlei, application speed limitation is performed first and then a NAT service is executed. For HTTP packets, however, no speed limitation is required. It can be learnt that in the method provided in this embodiment, different service processing paths can be allocated for different service flows. Therefore, each service execution entity needs to identify the service type of the packet, and determines the second service processing path corresponding to the packet according to the service type.

It should be noted that, if the corresponding first service processing path includes the identifier of performing layer L7 processing, which indicates a need of performing layer L7 processing on the packet, the second service processing path further includes the information about a service execution entity configured to perform layer L4 processing on the service packet. After the layer L7 processing is performed on the packet, certain layer L4 service processing may be further performed on the packet according to actual needs. For example, the NAT service belongs to a layer-4 service but is generally executed after a layer-7 service, which is primarily due to a dependence sequence between the services.

Step 204: The router sends, according to a target service path after encapsulation is performed on the service packet, an encapsulated service packet to the first-hop service execution entity in the service path for corresponding service processing, where the encapsulated service packet includes the user identifier.

In this embodiment, if the target service path is the first service processing path, the router sends the service packet to the first-hop service execution entity in the first service processing path for corresponding service processing; if the target service path is the second service processing path, the router sends the service packet to the first-hop service execution entity in the second service processing path for corresponding service processing; and, if the target service paths are the first service processing path and the second service processing path, because the first service processing path is executed first and then the second service processing path is executed, the router also sends the service packet to the first-hop service execution entity in the first service processing path for the corresponding service processing.

In the method provided in this embodiment, when the packet is processed, the packet is processed according to the first service processing path first and then processed according to the second service processing path, and different service flows are corresponding to different first service processing paths and different second service processing paths. Therefore, for different service flows, different service paths can be allocated, thereby implementing dynamic allocation of service paths.

Figure 3:
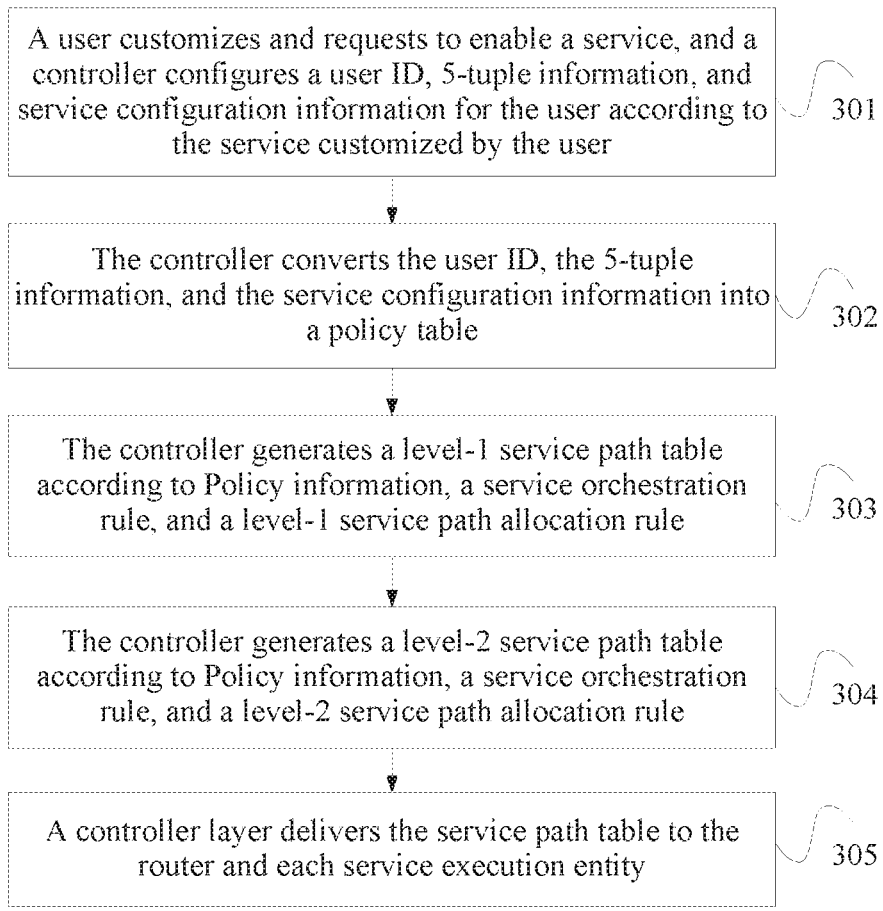
FIG. 3 is a flowchart of generating a service path by a controller according to a third embodiment of the present invention.

The following briefly describes how a controller generates a service path table according to a service customized by a user, and delivers the service path table to a service processing entity and a router. FIG. 3 is a flowchart of generating a service path by a controller according to a third embodiment of the present invention.

Step 301: A user customizes and requests to enable a service, and a controller configures a user identifier (ID), 5-tuple information, and service configuration information for the user according to the service customized by the user.

In this step, the service customized by the user includes: a NAT service, a layer-4 filtering firewall service, a uniform resource locator (URL) filtering service, an application filtering service, an application control service, a WOC function, and an Internet Protocol security (IPSec) tunneling function. The NAT function and the layer-4 filtering firewall function belong to layer LA services, and the URL filtering function, the application filtering function, the application control function, the WOC service, and the IPSec tunneling service belong to layer-7 services. Certainly, the layer-4 services may further include other functions such as QoS and speed limitation, and are merely exemplary herein and do not limit the layer-4 services and the layer-7 services.

In this embodiment, the user ID, the 5-tuple information, and the service configuration information may be configured for the user by the controller or according to the service customized by the user. For example, in a case of configuring traffic and return traffic that are sent from an IP address 192.168.1.0/24 to a destination address that is a public network, the following services are selected: a NAT service, which is used to translate a packet whose source IP address is 192.168.1.0/24 from a private network address into a public network address; a layer-4 filtering firewall service, which blocks illegal traffic from scanning and attacking a host at 192.168.1.0/24, and so on; a URL filtering function, which blocks access to a blacklisted website according to a website blacklist and whitelist that are configured by the user, and forbids a user whose IP address is 192.168.1.0/24 from using certain websites; an application filtering function, which blocks a QQ application according to customization of the user, and forbids the user whose IP address is 192.168.1.0/24 from using QQ; and an application control service, which limits a speed of a Xunlei application. For traffic and return traffic that are sent from 192.168.1.0/24 to a destination address 192.168.2.0/24, the following services are selected: a WOC service, which accelerates the traffic; and an IPSec tunneling function.

Step 302: The controller converts the user ID, the 5-tuple information, and the service configuration information into a policy table.

In this step, the policy (policy) table converted according to the user's service configuration information by the controller is described as follows. The table includes a user ID, 5-tuple information, and a service list, where * represents a wildcard.

service flow whose source IP address is 192.168.1.* and whose destination IP address is 192.168.2.*, the WOC service and the IPSec service are executed.

Step 303: The controller generates a level-1 service path table according to Policy information, a service orchestration rule, and a level-1 service path allocation rule.

In this step, the service orchestration rule is provided by an application service developer, services are divided into different service groups according to different service applications, and services in a same group are sequential. For example, the foregoing services customized by the user are divided into two groups: a service group that accesses an external network, and a service group that accesses an internal network. The service group that accesses an external network includes NAT, layer-4 firewall, application filtering, URL filtering, and application control, which are put into one group, where the layer-4 services are before the layer-7 services; before the layer-7 services, a DPI inspection is undergone to obtain a service type of a packet; a sequence between the application filtering and the URL filtering is arbitrary; and the NAT is placed after the layer-7 services. The service group that accesses an internal network includes the WOC service and the IPsec service, where a sequence of the services is that the WOC service is before the IPsec service.

Level-1 services refer to the layer-4 services before the layer-7 services. In this embodiment, the level-1 services include the layer-4 filtering firewall service and the NAT service, but the present invention does not limit the layer-4 services, and the level-1 services may further include other layer-4 services. The level-1 service path allocation rule refers to combining subsequent services by using the user ID

TABLE 1

A policy table converted from service configuration information

| User ID | Source IP | 5-tuple | | | | Service list |
| | | Destination IP | Source port | Destination port | Protocol | |
| --- | --- | --- | --- | --- | --- | --- |
| 1 | 192.168.*.* | * | * | * | * | Layer-4 filtering firewall |
| 1 | 192.168.1.* | * | * | * | * | Layer-4 filtering firewall |
| 1 | 192.168.1.* | * | 135 | * | * | Layer-4 filtering firewall |
| 1 | 192.168.1.* | * | * | * | * | NAT |
| 1 | 192.168.1.* | * | * | * | * | URL filtering |
| 1 | 192.168.1.* | * | * | * | * | Application filtering |
| 1 | 192.168.1.* | * | * | * | * | Application control |
| 1 | 192.168.1.* | 192.168.2.* | * | * | * | WOC |
| 1 | 192.168.1.* | 192.168.2.* | * | * | * | IPSec |

From Table 1, it can be learnt that, according to the user's service configuration information, for a service flow whose source IP address is 192.168.*.*, only the layer-4 filtering firewall service is executed; for a service flow whose source IP address is 192.168.1.*, the layer-4 filtering firewall service, the NAT service, the URL filtering service, the application filtering service, and the application control service need to be executed for a service flow whose source IP address is 192.168.1.* and whose source port is 135, only the layer-4 filtering firewall service is executed; and, for a and the 5-tuple information as an index. The layer-4 services are sorted according to a service orchestration rule. If services include a layer-7 service, the services are identified by using a layer L7 processing identifier a unified manner, regardless of the layer-7 service, indicating that the user has further customized a layer-7 service. In a feasible implementation manner, the layer L7 processing identifier is replaced with a DPI service, where the DPI service not only indicates that the user has customized a layer-7 service but also shows that a DPI inspection is performed on the packet after the layer-4 services are executed. If the user has not requested to enable a layer-7 service, the DPI service is not included, and the NAT service is executed directly.

According to the level-1 service path allocation rule, Table 2 is generated from the policy table with reference to the service orchestration rule, as described below.

TABLE 2

| | | | 5-tuple | | | | |
|---|---|---|---|---|---|---|---|
| User ID | Source IP | Destination IP | Source port | Destination port | Protocol | Service list | Service list |
| 1 | 192.168.*.* | * | * | * | * | Layer-4 filtering firewall | |
| 1 | 192.168.1.* | * | * | * | * | Layer-4 filtering firewall | DPI |
| 1 | 192.168.1.* | * | 135 | * | * | Layer-4 filtering firewall | |

Level-1 service path table

From Table 2, it can be learnt that the level-1 service path table includes a plurality of first service processing paths, where the first service processing path includes information about a service execution entity (not shown in the diagram) configured to perform layer L4 processing on the service packet, and an identifier indicating whether to perform layer L7 processing. According to the user's service configuration information, for a service flow whose source IP is 192.168.*.*, the layer-4 filtering firewall service is executed to block illegal traffic from scanning and attacking a host at 192.168.1.0/24, and so on; for a service flow whose source IP is 192.168.1.*, the layer-4 filtering firewall service is executed first to block illegal traffic from scanning and attacking the host at 192.168.1.0/24, and so on. Subsequently, because a layer-7 service is requested additionally for the service flow, the subsequent layer-7 service is uniformly replaced with the DPI service directly after the layer-4 filtering firewall service. For a service flow whose source IP is 192.168.1.* and whose source port is 135, the layer-4 filtering firewall service is executed to block illegal traffic from scanning and attacking the host at 192.168.1.0/24.

In this embodiment, in the level-1 service path, on one aspect, the DPI service identifies that a layer-7 service needs to be executed after the layer-4 services, and on the other aspect, the DPI service further indicates that a deep packet inspection is performed on the service flow after the layer-4 services. In a DPI technology, when an IP packet passes, the content of the packet can be analyzed to detect a service type of the packet. For example, if the user has customized URL filtering, a DPI service type is added and identified as an HTTP; if the user has customized application filtering, a DPI service type is added and identified as an application that needs to block QQ; and, if the user has customized application control, a DPI identification type is added and identified as an application that needs to perform speed limitation on Xunlei.

Step 304: The controller generates a level-2 service path table according to Policy information, a service orchestration rule, and a level-2 service path allocation rule.

Level-2 services refer to layer-7 services, and include a URL filtering service, an application filtering service, and an application control service. The level-2 service path allocation rule refers to combining subsequent services by using the user ID, the 5-tuple information and the service type identifier as an index. The layer-7 services are sorted according to a service orchestration rule. It should be noted that the level-2 service processing path further includes a layer-4 service NAT, which is determined according to successive dependence between services.

Table 3 is generated according to the level-2 service path allocation rule, the service orchestration rule, and the policy table, as shown below.

TABLE 3

| | | | 5-tuple | | | | | | |
|---|---|---|---|---|---|---|---|---|---|
| User ID | Source IP | Destination IP | Source port | Destination port | Protocol | Service type | Service 1 | Service 2 | Service 3 |
| 1 | 192.168.1.* | * | * | * | * | HTTP | URL filtering | Application filtering | NAT |
| 1 | 192.168.1.* | * | * | * | * | QQ | Application filtering | NAT | |
| 1 | 192.168.1.* | * | * | * | * | Xunlei | Application control | NAT | |
| 1 | 192.168.1.* | * | * | * | * | * | Application filtering | NAT | |

Level-2 service path table

From Table 3, it can be learnt that in this embodiment, the level-2 service path table includes a plurality of second service processing paths, where the second service processing path includes information about a service execution entity configured to perform layer L7 processing on the service packet. When the user has both customized the layer-4 services and customized the layer-7 services, during execution, the first service processing path is executed first, and then the second service processing path is executed. If the NAT service is placed in the first service processing path, in the first service processing path, the IP address of the service packet needs to be converted from a private network address into a public network address, and, in the second service processing path, when the packet is processed, the IP address on which the processing is based is the private network address. Because the private network address is already converted into the public network address in the first service processing path, the public network address is actually used when the packet is processed based on the second service processing path, which leads to an error that occurs when a service processing entity performs service processing on the packet according to the second service processing path. Therefore, the NAT service is placed after the layer-7 services.

As shown in Table 3, in a service flow whose user identifier is 1 and whose source IP address is 192.168.1.*, for a service packet whose DPI service type identifier is HTTP, the second service processing path of the service flow is sequentially executed in a sequence from URL filtering, to application filtering, to NAT; for a service packet whose service type identifier is a QQ application, the second service processing path of the service packet is sequentially executed in a sequence from application filtering to NAT; for a service packet whose service type identifier is a Xunlei application, the second service processing path of the service packet is executed in a sequence from application filtering to NAT; and, for applications whose service type identifier is others, the second service processing path of the applications is executed in a sequence from application filtering to NAT.

Step 305: A controller layer delivers the service path table to the router and each service execution entity.

The controller layer delivers the generated service path table to the router and each service execution entity, or delivers the service path table to a flow switch first and then the flow switch forwards the service path table to the service processing entity.

This embodiment only briefly describes a process in which a controller generates a service path table. Understandably, level-1 service path allocation and level-2 service path allocation rules that are used by the controller in generating each service path table are not limited herein, and execution orders of services in the first service processing path and the second service processing path may be flexibly adjusted according to an actual situation. The present invention is described by using examples but not limited to the examples.

Figure 4:
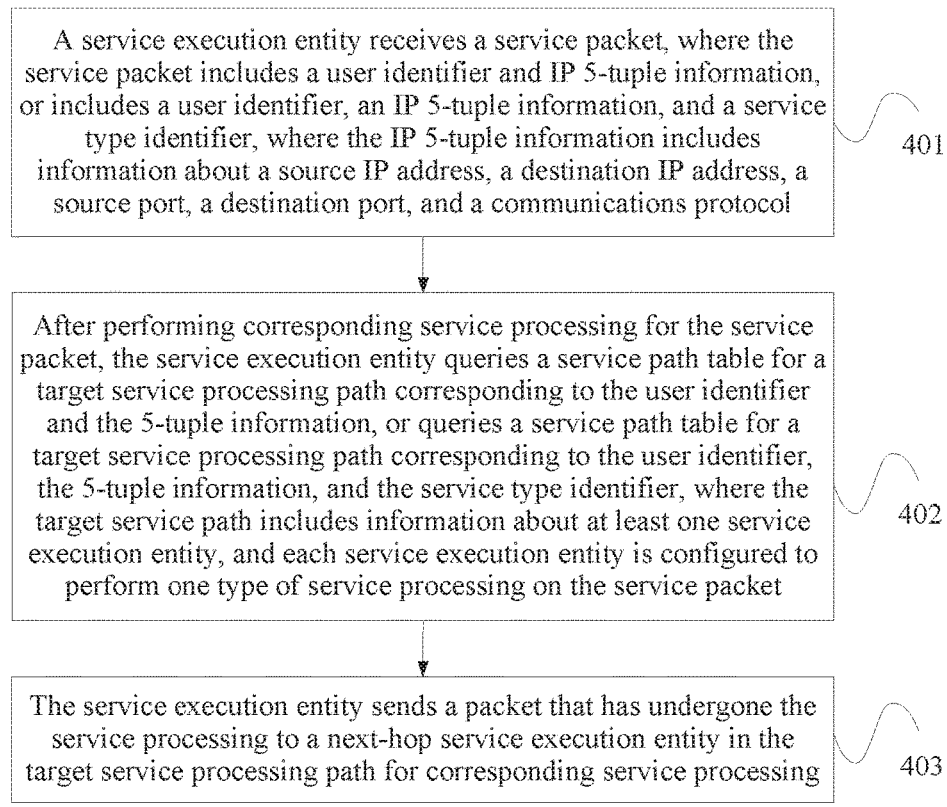
FIG. 4 is a flowchart of a service path allocation method according to a fourth embodiment of the present invention.

FIG. 4 is a flowchart of a service path allocation method according to a fourth embodiment of the present invention. The method provided in this embodiment is executed by each service execution entity. As shown in FIG. 4, the method provided in this embodiment includes the following steps:

Step 401: A service execution entity receives a service packet, where the service packet includes a user identifier and IP 5-tuple information, or includes a user identifier, an IP 5-tuple information, and a service type identifier, where the IP 5-tuple information includes information about a source IP address, a destination IP address, a source port, a destination port, and a communications protocol.

In this embodiment, when the service execution entity is the first-hop service execution entity in a target service processing path, the service execution entity receives the service packet sent by a router; when the service execution entity is not the first-hop service execution entity in the target service processing path, the service execution entity receives the service packet sent by a previous-hop service execution entity in the target service processing path. If the previous-hop service execution entity is configured to perform layer L4 processing on the packet, the received service packet includes the user identifier and the IP 5-tuple information. If the previous-hop service execution entity is configured to perform layer L7 processing on the packet, the received service packet includes the user identifier, the IP 5-tuple information, and the service type identifier, where, for the service type identifier, after a deep packet inspection entity performs a DPI inspection on the packet, the service type identifier is carried in the packet and sent to the service execution entity that performs layer L7 processing for the packet.

Step 402: After performing corresponding service processing for the service packet, the service execution entity queries a service path table for a target service processing path corresponding to the user identifier and the 5-tuple information, or queries a service path table for a target service processing path corresponding to the user identifier, the 5-tuple information, and the service type identifier, where the target service path includes information about at least one service execution entity, and each service execution entity is configured to perform one type of service processing on the service packet.

In this embodiment, before querying a service path table for a target service processing path corresponding to the user identifier and the 5-tuple information, or querying a service path table for a target service processing path corresponding to the user identifier, the 5-tuple information, and the service type identifier, the service execution entity receives the service path table delivered by a controller and stores the service processing path table.

The service path table includes a level-1 service path table and a level-2 service path table, where the level-1 service path table includes a plurality of first service processing paths and the level-2 service path table includes a plurality of second service processing paths. The first service processing path includes information about a service execution entity configured to perform layer IA processing on the service packet, and an identifier indicating whether to perform layer L7 processing; and the second service processing path includes information about a service execution entity configured to perform layer L7 processing on the service packet.

In this embodiment, an example that each service execution entity processes one type of service is used. If the service execution entity is configured to perform layer L4 processing on the service packet, after the service execution entity receives the service packet sent by the previous-hop service entity and performs corresponding service processing on the service packet, the service execution entity queries the service path table for the target service processing path corresponding to the user identifier and the 5-tuple information. If the service execution entity is configured to perform layer L7 processing for the service packet, after the service execution entity receives the service packet sent by the previous-hop service entity and performs corresponding service processing on the service packet, the service execution entity queries the service path table for the target service processing path corresponding to the user identifier, the 5-tuple information, and the service type identifier.

Step 403: The service execution entity sends a packet that has undergone the service processing to a next-hop service execution entity in the target service processing path for corresponding service processing.

After performing processing on the packet, the service execution entity queries for and obtains a first service processing path or a second service processing path that is corresponding to the packet, and forwards the packet to the next-hop service execution entity in the corresponding service processing path according to the first service processing path or the second service processing path.

In the method provided in this embodiment, the service path table is stored on the service execution entity. After receiving the service packet and performing corresponding processing on the packet, the service execution entity queries for the corresponding target service path according to the user identifier, the 5-tuple information, and/or the service type identifier that are included in the service packet, and then, according to the target service path, sends a processed packet to the next-hop service execution entity for corresponding processing. In the method provided in this embodiment, for different service packets, the target service path is different. Therefore, for different service flows, different service paths can be allocated.

In step 402, querying a service path table for a target service processing path corresponding to the user identifier and the 5-tuple information is specifically that: if the service execution entity is included in the first service processing path, querying, by the service execution entity, the level-1 service path table for a first service processing path corresponding to the user identifier and the 5-tuple information. If the corresponding first service processing path includes an identifier of not performing layer L7 processing, the corresponding first service processing path is the target service processing path.

If the service execution entity is the last-hop node in the first service processing path, after the service execution entity queries the level-1 service path table for the first service processing path corresponding to the user identifier and the 5-tuple information, if the corresponding first service processing path includes an identifier of performing layer L7 processing, the service execution entity forwards the packet to the deep packet inspection service execution entity, and the deep packet inspection service execution entity performs a deep packet inspection on the packet to parse and obtain a service type identifier of the service packet. If the layer L7 processing identifier in the first service processing path is replaced with a DPI service, the DPI inspection service may be used as the last service in the first service processing path, and correspondingly, the deep packet inspection service execution entity is configured as the last-hop node in the first service processing path.

After detecting a type of the service packet, the deep packet inspection service execution entity identifies the type of the service packet, for example, by adding a flag in header information of the packet to identify a service type of the service packet, so that the service execution entity that performs the layer-7 service queries, according to the type of the packet, the level-2 service path table for the second service processing path corresponding to the user identifier, the 5-tuple information, and the service type identifier, where the corresponding first service processing path and the corresponding second service processing path are the target service processing paths.

In this embodiment, the second service processing path may also include information about a service execution entity configured to perform layer L4 processing on the service packet. For the layer L4 service processing performed by the user for the packet, reference may be made to the description in the third embodiment, and no repeated description is given herein any further.

According to the user's service configuration information, for a service flow whose source IP is 192.168.1.*, a layer-4 filtering firewall service is executed first according to the level-1 service path table, and then the service flows undergo a deep packet inspection under an effect of the DPI identifier, so as to obtain an identification type bit corresponding to the service flow. Then, in the service flow, layer-7 services are executed separately according to the level-2 service path table. For example, if the deep packet service execution entity identifies that a type bit of the service flow is HTTP, the deep packet service execution entity executes a blacklist website access block service according to a website blacklist and a whitelist that are configured by the user, and completes a URL filtering function, and then executes NAT; if the type bit of the service flow is QQ, a QQ application block service is executed and an application filtering function is completed; if the type bit of the service flow is Xunlei, a Xunlei speed limitation service is executed and an application control function is completed; and, if the DPI identification type bit is *, a WOC or IPSec function is executed. Finally, after the corresponding layer-7 services are completed for the service flow, a NAT service is executed so that a private network address is converted into a public network address.

Figure 5:
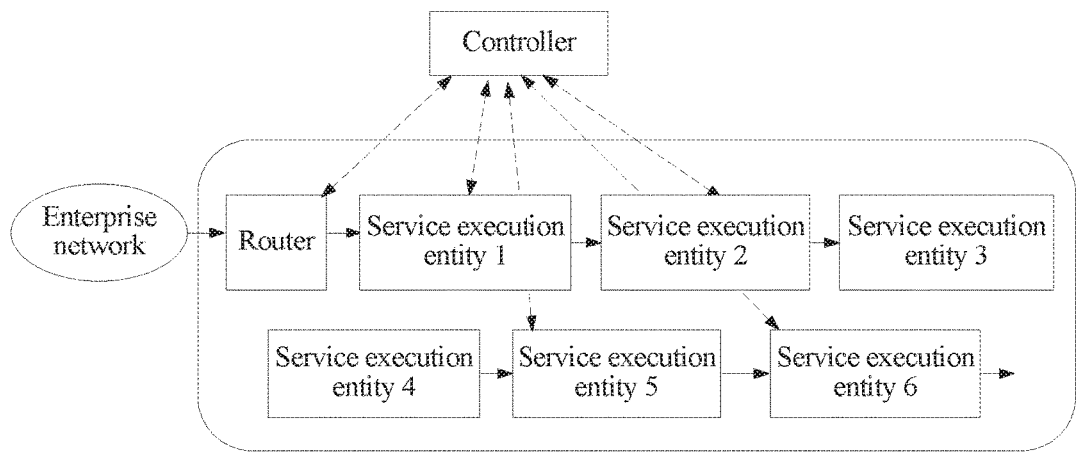
FIG. 5 is a schematic diagram of a network structure to which the present invention applies.

FIG. 5 is a schematic diagram of a network structure to which the present invention applies. A fifth embodiment of the present invention is described by using FIG. 5 as an example. As shown in FIG. 5, an enterprise network is connected to a router; all data flows inside the enterprise network communicate with an external network by using the router; the router is connected to a service execution entity 1; and the service execution entity 1, a service execution entity 2, a service execution entity 3, a service execution entity 4, a service execution entity 5, and a service execution entity 6 are connected sequentially. In this embodiment, FIG. 5 is merely a schematic diagram. In fact, the router can communicate with each of the service execution entities, the service execution entities can communicate with each other, and a controller can also communicate with the router and each of the service execution entities.

In this embodiment, it is assumed that the service execution entity 1 is configured to perform layer-4 firewall filtering on a packet, the service execution entity 2 is configured to perform a DPI inspection on the packet, the service execution entity 3 is configured to perform URL filtering on the packet, the service execution entity 4 is configured to perform application filtering on the packet, the service execution entity 5 is configured to perform application control on the packet, and the service execution entity 6 is configured to perform a NAT service on the packet.

Referring to Table 1, Table 2, Table 3, and FIG. 5, the controller delivers a generated service path table to the router and each service execution entity, and the router and each service execution entity store the service path table. After a service packet is transmitted from the enterprise network to the router, the router queries a level-1 service path table according to a user identifier and 5-tuple information of the packet to obtain a first service processing path corresponding to the packet. If the first service processing path includes an identifier of performing layer L7 processing on the packet, a target service path corresponding to a service of the packet includes a first service processing path and a second service processing path, where the first service processing path includes information about a service execution entity configured to perform layer L4 processing on the service packet, and the second service processing path includes information about a service execution entity configured to perform layer L7 processing on the service packet. If the first service processing path does not include the identifier of performing layer L7 processing on the packet, the target service path corresponding to the service of the packet includes only the first service processing path.

According to a found target service path, the router performs encapsulation on the packet, encapsulates the obtained user identifier into the packet, and forwards an encapsulated packet to the first-hop service execution entity in the target service path. When the target service path includes only the first service processing path or the target service paths include the first service processing path and the second service processing path, the router forwards the service packet to the first service execution entity in the first service processing path. When the target service path includes only the second service processing path, the service packet is forwarded to the first-hop service execution entity in the second service processing path.

As shown in Table 2, it is assumed that corresponding to the packet, a user ID is 1, a source IP address is 192.168.1.36, a destination IP address is 192.168.3.45, a source port is 80, a destination port is 92, and a protocol type is arbitrary. After the packet enters a service router and undergoes layer L2 and layer L3 processing, the service path table is queried according to the user ID and the 5-tuple information. First, a corresponding first service processing path is found in the service path table according to a user ID 1. As shown in Table 1, there are three first service processing paths whose user IDs are 1. Subsequently, matching is performed according to the 5-tuple information. Because the source IP address is 192.168.1.36, which falls within a scope in which the user ID is 1 and the source IP is 192.168.1.*, the target service path 192.168.1.* is excluded. Therefore, two optional first service processing paths remain. Subsequently, matching is performed on the destination IP address, the source port number, the destination port number, and the protocol type of the packet sequentially. The source port number of the packet is 80. From Table 2, it can be learnt that the first service processing path corresponding to the packet is: first, a layer-4 firewall filtering service is performed, and the first service processing path table includes a DPI identifier, which indicates that layer-7 service processing still needs to be performed for the packet. Therefore, the router sends the packet to a first service execution entity, that is, the service execution entity 1, in the first service processing path. After performing layer-4 firewall filtering processing on the service packet and performing processing on the service, the service execution entity 1 queries for the first service processing path according to the user ID and the 5-tuple information, and forwards, according to the first service processing path, the packet to a deep packet inspection implementation entity, that is, a service execution entity 2, to perform a deep packet inspection. After performing the deep packet inspection on the packet, the service execution entity 2 makes a type identifier of the service packet be carried in the packet, and then queries the service path table for the second service processing path according to the user ID, the 5-tuple information, and the type identifier of the service packet.

As shown in Table 2, assuming that the type identifier of the service packet is HTTP, the second service processing path of the packet is: URL filtering-application filtering-NAT service. The service execution entity 2 sends the packet that carries a service type identifier to a service execution entity 3 for URL filtering processing. After performing the URL filtering processing on the packet, the service execution entity 3 queries the service path table for the second service processing path according to the user ID, the 5-tuple information, and the service packet type, and forwards the packet to a service execution entity 4 for application filtering processing. After performing the application filtering on the packet, the service execution entity 4 queries the service path table for the second service processing path according to the user ID, the 5-tuple information, and the type identifier of the service packet, and forwards, according to the second service processing path, the packet to a service execution entity 6 for NAT service processing. After performing the service processing on the packet, the service execution entity 6 forwards the packet to a next router according to route information.

Assuming that the type identifier of the service packet is QQ, the second service processing path of the service packet is: application filtering-NAT service. The service execution entity 2 makes the service type identifier be carried in the packet, and forwards the packet to the service execution entity 4 for application filtering processing. After performing the application filtering processing on the packet, the service execution entity 4 queries the service path table for the second service processing path according to the user ID, the 5-tuple information, and the type identifier of the service packet, and forwards, according to the second service processing path, the packet to the service execution entity 6 for NAT service processing. After performing the service processing on the packet, the service execution entity 6 forwards the packet to a next router according to route information.

Assuming that the type identifier of the service packet is Xunlei, the second service processing path of the service packet is: application control-NAT service. The service execution entity 2 makes the service type identifier be carried in the packet, and forwards the packet to the service execution entity 5 for application control processing. After performing the application control processing on the packet, the service execution entity 5 queries the service path table for the second service processing path according to the user ID, the 5-tuple information, and the type identifier of the service packet, and forwards, according to the second service processing path, the packet to the service execution entity 6 for NAT service processing. After performing the service processing on the packet, the service execution entity 6 forwards the packet to a next router according to route information.

In this embodiment, for different packets, the corresponding service paths are different, and a service path can be decided dynamically according to the user's configuration and different flow types.

According to the method provided in this embodiment, in a next-generation network management system, a control plane is separated from a forwarding plane, a controller manages routers and service execution entities in a unified manner, the controller plays a role of decision making, and the routers and the service execution entities implement packet forwarding according to a service path table delivered by the controller. The controller isolates a router's services of a management nature in an original network, and the controller makes a policy, and diverts a service flow onto a dedicated service execution entity for processing. When addition of a certain newly developed service is required, a network operator needs only to add one service execution entity to the network for implementation, which does not affect original configurations of the router and the service execution entity, is convenient and flexible, and can improve expansibility of a metropolitan area network.

Figure 6:
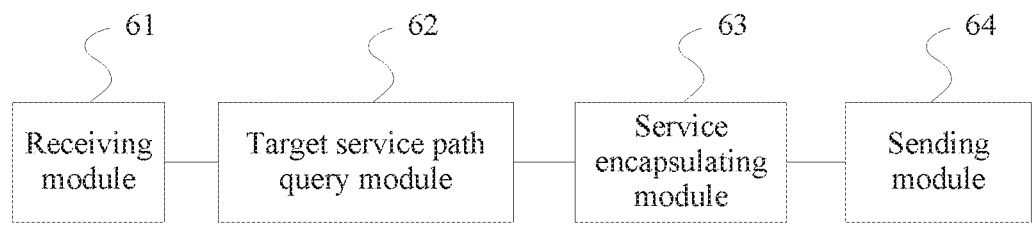
FIG. 6 is a schematic structural diagram of a router according to a sixth embodiment of the present invention.

FIG. 6 is a schematic structural diagram of a router according to a sixth embodiment of the present invention. As shown in FIG. 6, the router provided in this embodiment includes a receiving module 61, a target service path query module 62, a service encapsulating module 63, and a sending module 64.

The receiving module 61 is configured to receive a service packet of a user, and obtain a user identifier and Internet Protocol IP 5-tuple information according to the service packet, where the IP 5-tuple information includes information about a source IP address, a destination IP address, a source port, a destination port, and a communications protocol.

The target service path query module 62 is configured to query a service path table for a target service processing path corresponding to the user identifier and the 5-tuple information, where the target service path includes information about at least one service execution entity, and each service execution entity is configured to perform one type of service processing on the service packet.

The service encapsulating module 63 is configured to encapsulate the service packet, where an encapsulated service packet includes the user identifier.

The sending module 64 is configured to send the encapsulated packet to the first-hop service execution entity in the service path for corresponding service processing according to the service path after the service encapsulating module 63 encapsulates the service packet, so as to perform.

In this embodiment, the receiving module 61 is further configured to receive the service path table delivered by a controller, where the controller generates the service path table according to a service customized by a user, and delivers the service path table to the router and each service processing entity. The service path table includes a level-1 service path table and a level-2 service path table, where the level-1 service path table includes a plurality of first service processing paths and the level-2 service path table includes a plurality of second service processing paths; the first service processing path includes information about a service execution entity configured to perform layer L4 processing on the service packet, and an identifier indicating whether to perform layer L7 processing; and the second service processing path includes information about a service execution entity configured to perform layer L7 processing on the service packet. When the target service processing path corresponding to the packet includes a first service processing path and a second service processing path, the first service processing path is executed first, and then the second service processing path is executed.

The method provided in this embodiment can be used to implement the methods provided in the first embodiment and the second embodiment. Specific implementation manners and technical effects are similar and are not repeated herein any further.

In a feasible implementation manner of the present invention, the target service path query module 62 is specifically configured to: after receiving the service packet of the user, query the level-1 service path table for a first service processing path corresponding to the user identifier and the 5-tuple information, where, if the corresponding first service processing path includes an identifier of not performing layer L7 processing, the corresponding first service processing path is the target service processing path.

If the corresponding first service processing path includes an identifier of performing layer L7 processing, the last-hop service execution entity in the corresponding first service processing path is further configured to forward the packet to a deep packet inspection service execution entity after performing corresponding service processing for the service packet, and the deep packet inspection service execution entity performs a deep packet inspection on the packet to parse and obtain a service type identifier of the service packet. Therefore, the target service path query module 62 is specifically configured to: if the corresponding first service processing path includes the identifier of performing layer L7 processing, query the level-2 service path table for a second service processing path corresponding to the user identifier, the 5-tuple information, and the service type identifier, where the corresponding first service processing path and the corresponding second service processing path are the target service processing paths.

After performing the deep packet inspection on the packet, the deep packet inspection service execution entity makes the service type identifier be carried in the packet, and queries for and obtains the second service processing path according to the user identifier, the 5-tuple information, and the service type identifier, and sends a packet that carries the service type identifier to the first-hop service execution entity in the second service processing path according to the second service processing path. Therefore, a processor 81 of the service execution entity located in the second service processing path is specifically configured to: after receiving the service packet, query the level-2 service path table for a second service processing path corresponding to the user identifier, the 5-tuple information, and the service type identifier, where the corresponding first service processing path and the corresponding second service processing path are the target service processing paths.

It should be noted that, if the corresponding first service processing path includes the identifier of performing layer L7 processing, the second service processing path further includes information about a service execution entity configured to perform layer L4 processing on the service packet. That is, after completion of executing a layer-7 service, a layer-4 service processing may also be executed according to a need.

Figure 7:
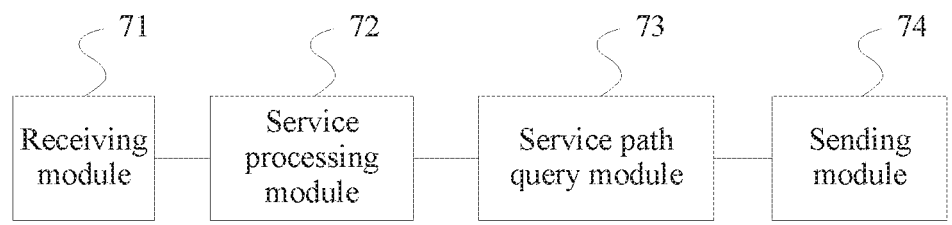
FIG. 7 is a schematic structural diagram of a service execution entity according to a seventh embodiment of the present invention.

FIG. 7 is a schematic structural diagram of a service execution entity according to a seventh embodiment of the present invention. As shown in FIG. 7, the service execution entity provided in this embodiment includes a receiving module 71, a service path query module 72, a service processing module 73, and a sending module 74.

The receiving module 71 is configured to receive a service packet, where the service packet includes a user identifier and IP 5-tuple information, or includes a user identifier, an IP 5-tuple information, and a service type identifier, where the IP 5-tuple information includes information about a source IP address, a destination IP address, a source port, a destination port, and a communications protocol.

The service processing module 72 is configured to perform corresponding service processing on the service packet.

The service path query module 73 is configured to, after the service processing module performs the corresponding service processing on the service packet, query a service path table for a target service processing path corresponding to the user identifier and the 5-tuple information, or query a service path table for a target service processing path corresponding to the user identifier, the 5-tuple information, and the service type identifier, where the target service path includes information about at least one service execution entity, and each service execution entity is configured to perform one type of service processing on the service packet.

The sending module 74 is configured to send a packet that has undergone the service processing performed by the service processing module 73 to a next-hop service execution entity in the target service processing path for corresponding service processing.

The receiving module 71 is specifically configured to receive the service packet sent by a router, or receive the service packet sent by a previous-hop service execution entity in the target service processing path. Specifically, when the service execution entity is the first-hop service execution entity in a target service processing path, the receiving module 71 receives the service packet sent by the router; when the service execution entity is not the first-hop service execution entity in the target service processing path, the receiving module 71 receives the service packet sent by a previous-hop service execution entity in the target service processing path.

In this embodiment, the receiving module 71 is further configured to receive the service path table delivered by a controller. The service path table includes a level-1 service path table and a level-2 service path table, where the level-1 service path table includes a plurality of first service processing paths and the level-2 service path table includes a plurality of second service processing paths; the first service processing path includes information about a service execution entity configured to perform layer L4 processing on the service packet, and an identifier indicating whether to perform layer L7 processing; and the second service processing path includes information about a service execution entity configured to perform layer L7 processing on the service packet.

The method provided in this embodiment is used to implement the technical solutions provided in the third to fifth method embodiments. Specific implementation manners and technical effects are similar and are not repeated herein any further.

In a feasible implementation manner of the present invention, if the service execution entity is included in the first service processing path, the service path query module 72 of the service execution entity is specifically configured to query the level-1 service path table for a first service processing path corresponding to the user identifier and the 5-tuple information. If the corresponding first service processing path includes an identifier of not performing layer L7 processing, the corresponding first service processing path is the target service processing path.

If the service execution entity is the last-hop node in the first service processing path and the corresponding first service processing path includes an identifier of performing layer L7 processing, the sending module forwards the packet to a deep packet inspection service execution entity, and the deep packet inspection service execution entity performs a deep packet inspection on the packet to parse and obtain the service type identifier of the service packet. In addition, the service path query module 72 of the deep packet inspection service execution entity is configured to query the level-2 service path table for a second service processing path corresponding to the user identifier, the 5-tuple information, and the service type identifier, where the corresponding first service processing path and the corresponding second service processing path are the target service processing paths.

In addition, in this embodiment, after detecting a service type of the service packet, the deep packet inspection entity adds the service type identifier into the packet, and sends the packet to the first-hop service execution entity in the second service processing path table for corresponding processing. In this way, after receiving the packet, all service execution entities in the second service processing path table can query for the corresponding second service processing path according to the service type identifier of the packet.

If the service execution entity is included in the second service processing path, the service path query module 72 of the service execution entity is specifically configured to query the level-2 service path table for a second service processing path corresponding to the user identifier, the 5-tuple information, and the service type identifier.

Figure 8:
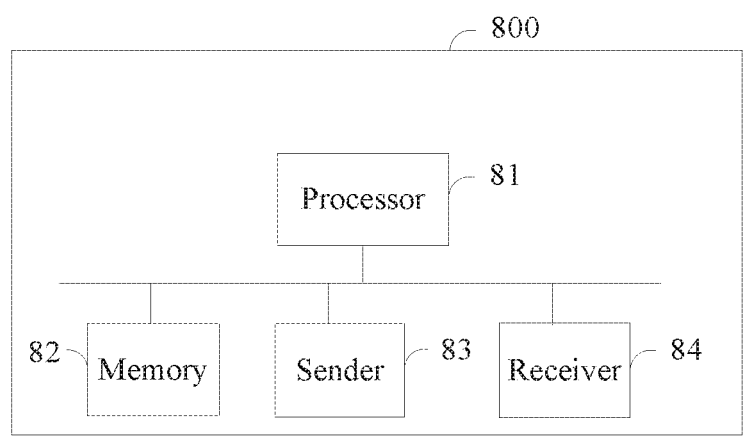
FIG. 8 is a schematic structural diagram of a router according to an eighth embodiment of the present invention.

FIG. 8 is a schematic structural diagram of a router according to an eighth embodiment of the present invention. As shown in FIG. 8, a router 800 provided in this embodiment includes a processor 81 and a memory 82, and the router 800 may further include a sender 83 and a receiver 84. The sender 83 and the receiver 84 may be connected to the processor 81 by using a bus. The memory 82 stores an execution instruction. When the router 800 runs, the processor 81 communicates with the memory 82, and the processor 81 executes the execution instruction so that the router 800 executes the service path allocation method provided in the present invention.

The receiver 84 receives a service packet of a user, and obtains a user identifier and Internet Protocol IP 5-tuple information according to the service packet, where the IP 5-tuple information includes information about a source IP address, a destination IP address, a source port, a destination port, and a communications protocol.

The processor 81 queries a service path table for a target service processing path corresponding to the user identifier and the 5-tuple information, where the target service path includes information about at least one service execution entity, and each service execution entity is configured to perform one type of service processing on the service packet.

The sender 83 is configured to send, according to the service path after encapsulation is performed on the service packet, an encapsulated service packet to the first-hop service execution entity in the service path for corresponding service processing, where the encapsulated service packet includes the user identifier.

The service path table is a service path table delivered by a controller and received by the receiver 84, and is stored in the memory 82. The service path table includes a level-1 service path table and a level-2 service path table, where the level-1 service path table includes a plurality of first service processing paths and the level-2 service path table includes a plurality of second service processing paths; the first service processing path includes information about a service execution entity configured to perform layer L4 processing on the service packet, and an identifier indicating whether to perform layer L7 processing; and the second service processing path includes information about a service execution entity configured to perform layer L7 processing on the service packet.

After the receiver 84 receives the service packet of the user, the processor 81 first queries the level-1 service path table for a first service processing path corresponding to the user identifier and the 5-tuple information, where, if the corresponding first service processing path includes an identifier of not performing layer L7 processing, the corresponding first service processing path is the target service processing path. After the processor 81 performs layer L2 and layer L3 processing on the packet, the sender 83 sends the packet to the first-hop service execution entity in the first service processing path.

If the corresponding first service processing path includes an identifier of performing layer L7 processing, the last-hop service execution entity in the corresponding first service processing path is further configured to use the sender 84 to forward the packet to a deep packet inspection service execution entity after performing corresponding service processing on the service packet, and the deep packet inspection service execution entity performs a deep packet inspection on the packet to parse and obtain a service type identifier of the service packet. Then, the processor 81 of the service execution entity located in the second service processing path is specifically configured to query the level-2 service path table for a second service processing path corresponding to the user identifier, the 5-tuple information, and the service type identifier, where the corresponding first service processing path and the corresponding second service processing path are the target service processing paths.

It should be noted that, if the corresponding first service processing path includes the identifier of performing layer L7 processing, the second service processing path may further include information about a service execution entity configured to perform layer L4 processing on the service packet. That is, after layer-7 service processing is performed on the packet, layer-4 service processing may also be performed on the packet.

The method provided in this embodiment may be used to implement the technical solutions provided in the first and second method embodiments. Specific implementation manners and technical effects are similar and are not repeated herein any further.

Figure 9:
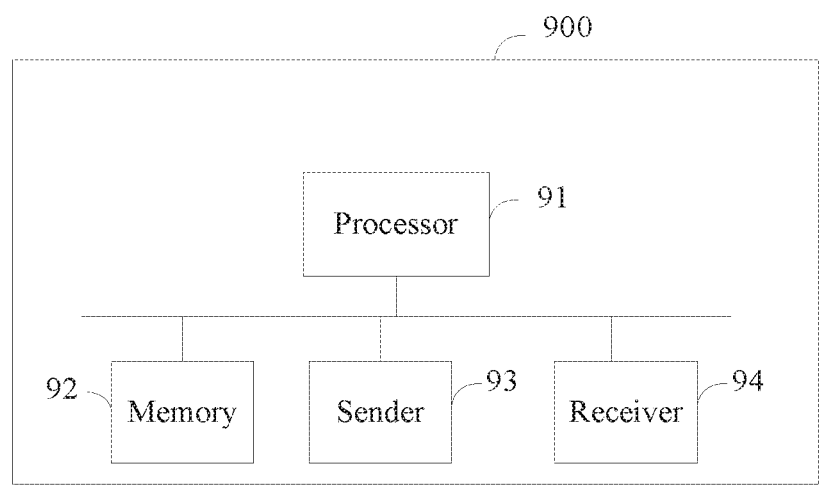
FIG. 9 is a schematic structural diagram of a service execution entity according to a ninth embodiment of the present invention.

FIG. 9 is a schematic structural diagram of a service execution entity according to a ninth embodiment of the present invention. As shown in FIG. 9, a service execution entity 900 provided in this embodiment includes a processor 91 and a memory 92, and the service execution entity 900 may further include a sender 93 and a receiver 94. The sender 93 and the receiver 94 may be connected to the processor 91 by using a bus. The memory 92 stores an execution instruction. When the service execution entity runs, the processor 91 communicates with the memory 92, and the processor 91 executes the execution instruction so that the service execution entity executes the service path allocation method provided in the present invention.

The receiver 94 is configured to receive a service packet, where the service packet includes a user identifier and IP 5-tuple information, or includes a user identifier, an IP 5-tuple information, and a service type identifier, where the IP 5-tuple information includes information about a source IP address, a destination IP address, a source port, a destination port, and a communications protocol.

The processor 91 is configured to: after performing corresponding service processing on the service packet, query a service path table for a target service processing path corresponding to the user identifier and the 5-tuple information, or query a service path table for a target service processing path corresponding to the user identifier, the 5-tuple information, and the service type identifier, where the target service path includes information about at least one service execution entity, and each service execution entity is configured to perform one type of service processing on the service packet.

The sender 93 is configured to send a packet that has undergone the service processing performed by the processor 91 to a next-hop service execution entity in the target service processing path for corresponding service processing.

The receiver 94 is specifically configured to receive the service packet sent by a router, or receive the service packet sent by a previous-hop service execution entity in the target service processing path. Specifically, when the service execution entity is the first-hop service execution entity in the target service processing path, the receiver 94 receives the service packet sent by the router; when the service execution entity is another service execution entity in the target service processing path, the receiver 94 receives the service packet sent by the previous-hop service execution entity.

In this embodiment, the receiver 94 is further configured to receive the service path table delivered by a controller and store the service path table in the memory 92. The service path table includes a level-1 service path table and a level-2 service path table, where the level-1 service path table includes a plurality of first service processing paths and the level-2 service path table includes a plurality of second service processing paths; the first service processing path includes information about a service execution entity configured to perform layer L4 processing on the service packet, and an identifier indicating whether to perform layer L7 processing; and the second service processing path includes information about a service execution entity configured to perform layer L7 processing on the service packet.

If the service execution entity is included in the first service processing path, the processor 91 is specifically configured to query the level-1 service path table for a first service processing path corresponding to the user identifier and the 5-tuple information. If the corresponding first service processing path includes an identifier of not performing layer L7 processing, the corresponding first service processing path is the target service processing path.

If the corresponding first service processing path includes an identifier of performing layer L7 processing and the service execution entity is the last-hop node in the first service processing path, after the service execution entity queries the level-1 service path table for the first service processing path corresponding to the user identifier and the 5-tuple information, the sender 93 is further configured to forward the packet to a deep packet inspection service execution entity, and the deep packet inspection service execution entity performs a deep packet inspection on the packet to parse and obtain a service type identifier of the service packet, after parsing out the service type of the service packet, the deep packet inspection service execution entity queries the level-2 service path table for a second service processing path corresponding to the user identifier, the 5-tuple information, and the service type identifier, where the corresponding first service processing path and the corresponding second service processing path are the target service processing paths. After finding the second service processing path corresponding to the packet, the deep packet inspection service execution entity sends the service packet to the first-hop service execution entity in the second service processing path.

If the service execution entity is included in the second service execution entity, the processor 91 is specifically configured to: after performing corresponding processing on the service packet, query the level-2 service path table for a second service processing path corresponding to the user identifier, the 5-tuple information, and the service type identifier, and use the sender 93 to send, according to the second service processing path, the packet to a next-hop service execution entity.

The service execution entity provided in this embodiment may be used to implement the technical solutions provided in the third to fourth method embodiments. Specific implementation manners and technical effects are similar and are not repeated herein any further.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A service path allocation method, comprising:
   receiving, by a router, a service packet of a user, and obtaining a user identifier and Internet Protocol (IP) 5-tuple information according to the service packet, wherein the IP 5-tuple information comprises information about a source IP address, a destination IP address, a source port, a destination port, and a communications protocol;
   querying, by the router, a service path table for a target service processing path corresponding to the user identifier and the 5-tuple information, wherein the target service processing path comprises information about at least one service execution entity, and each service execution entity performs one type of service processing on the service packet;
   sending, by the router according to the target service processing path after encapsulation is performed on the service packet, an encapsulated service packet to the first-hop service execution entity in the target service processing path for corresponding service processing, wherein the encapsulated service packet comprises the user identifier;
   wherein the service path table comprises a level-1 service path table and a level-2 service path table, wherein the level-1 service path table comprises a plurality of first service processing paths, and the level-2 service path table comprises a plurality of second service processing paths;
   wherein the first service processing path comprises information about a service execution entity performing L4 processing on the service packet, and an identifier indicating whether to perform L7 processing;
   wherein the second service processing path comprises information about a service execution entity performing L7 processing on the service packet, and
   wherein the querying, by the router, a service path table for a target service processing path corresponding to the user identifier and the 5-tuple information comprises:
   in response to the corresponding first service processing path comprising an identifier of performing L7 processing, querying, by the router, the level-2 service path table for a second service processing path corresponding to the user identifier, the 5-tuple information, and a service type identifier, wherein the corresponding first service processing path and the corresponding second service processing path are the target service processing paths.

2. The method according to claim 1, wherein the querying, by the router, a service path table for a target service processing path corresponding to the user identifier and the 5-tuple information comprises:
   querying, by the router, the level-1 service path table for a first service processing path corresponding to the user identifier and the 5-tuple information; wherein
   in response to the corresponding first service processing path comprising an identifier of skipping performing L7 processing, the corresponding first service processing path is the target service processing path.

3. The method according to claim 2, wherein the querying, by the router, a service path table for a target service processing path corresponding to the user identifier and the 5-tuple information further comprises:
   in response to the corresponding first service processing path comprising the identifier of performing L7 processing, forwarding, by the last-hop service execution entity in the corresponding first service processing path, the service packet to a deep packet inspection service execution entity after performing corresponding service processing on the service packet, and performing, by the deep packet inspection, a deep packet inspection on the service packet to parse and obtain a service type identifier of the service packet.

4. A service path allocation method, comprising:
   receiving, by a service execution entity, a service packet, wherein the service packet comprises a user identifier and Internet Protocol (IP) 5-tuple information, or comprises a user identifier, IP 5-tuple information, and a service type identifier, wherein the IP 5-tuple information comprises information about a source IP address, a destination IP address, a source port, a destination port, and a communications protocol;
   after performing corresponding service processing on the service packet, querying, by the-service execution entity, a service path table for a target service processing path corresponding to the user identifier and the 5-tuple information, or querying a service path table for a target service processing path corresponding to the user identifier, the 5-tuple information, and the service type identifier, wherein the target service processing path comprises information about at least one service execution entity, and each service execution entity performs one type of service processing on the service packet;
   sending, by the service execution entity, a packet that has undergone the service processing to a next-hop service execution entity in the target service processing path for corresponding service processing;
   wherein the service path table comprises a level-1 service path table and a level-2 service path table, wherein the level-1 service path table comprises a plurality of first service processing paths and the level-2 service path table comprises a plurality of second service processing paths;
   the first service processing path comprises information about a service execution entity performing L4 processing on the service packet, and an identifier indicating whether to perform L7 processing; and the second service processing path comprises information about a service execution entity performing L7 processing on the service packet, wherein in response to the service execution entity being the last-hop node in the first service processing path, after the querying, by the service execution entity, the level-1 service path table for a first service processing path corresponding to the user identifier and the 5-tuple information, further comprising:

in response to the corresponding first service processing path comprising an identifier of performing L7 processing, forwarding, by the service execution entity, the service packet to a deep packet inspection service execution entity, and performing, by the deep packet inspection service execution entity, a deep packet inspection on the service packet to parse and obtain the service type identifier of the service packet; and querying, by the deep packet inspection service execution entity, the level-2 service path table for a second service processing path corresponding to the user identifier, the 5-tuple information, and the service type identifier, wherein the corresponding first service processing path and the corresponding second service processing path are the target service processing paths.

5. The method according to claim 4, wherein the querying a service path table for a target service processing path corresponding to the user identifier and the 5-tuple information comprises:

in response to the service execution entity being comprised in the first service processing path, querying, by the service execution entity, the level-1 service path table for a first service processing path corresponding to the user identifier and the 5-tuple information.

6. A router, comprising:

a receiver, configured to receive a service packet of a user, and obtain a user identifier and Internet Protocol IP 5-tuple information according to the service packet, wherein the IP 5-tuple information comprises information about a source IP address, a destination IP address, a source port, a destination port, and a communications protocol;

a processor, configured to query a service path table for a target service processing path corresponding to the user identifier and the 5-tuple information, wherein the target service processing path comprises information about at least one service execution entity, and each service execution entity performs one type of service processing on the service packet; and a sender, configured to send, according to the target service processing path after encapsulation is performed on the service packet, an encapsulated service packet to the first-hop service execution entity in the target service processing path for corresponding service processing, wherein the encapsulated service packet comprises the user identifier;

wherein the service path table comprises a level-1 service path table, wherein the level-1 service path table comprises a plurality of first service processing paths;

the first service processing path comprises information about a service execution entity performing L4 processing on the service packet, and an identifier indicating whether to perform L7 processing; and the service path table further comprises a level-2 service path table, wherein the level-2 service path table comprises a plurality of second service processing paths;

the second service processing path comprises information about a service execution entity performing L7 processing on the service packet, and in response to the corresponding first service processing path comprising the identifier of performing L7 processing, the processor is configured to:

query the level-2 service path table for a second service processing path corresponding to the user identifier, the 5-tuple information, and the service type identifier, wherein the corresponding first service processing path and the corresponding second service processing path are the target service processing paths.

7. The router according to claim 6, wherein the processor is configured to query the level-1 service path table for a first service processing path corresponding to the user identifier and the 5-tuple information; and in response to the corresponding first service processing path comprising an identifier of skipping performing L7 processing, the corresponding first service processing path is the target service processing path.

8. The router according to claim 7, wherein, in response to the corresponding first service processing path comprising an identifier of performing L7 processing, forwarding, by the last-hop service execution entity in the corresponding first service processing path, the service packet to a deep packet inspection service execution entity after performing corresponding service processing on the service packet, and performing, by the deep packet inspection service execution entity, a deep packet inspection on the service packet to parse and obtain a service type identifier of the service packet.

9. The router according to claim 8, wherein, in response to the corresponding first service processing path comprising the identifier of performing L7 processing, the second service processing path further comprises information about a service execution entity performing L4 processing on the service packet.

10. A service execution entity, comprising:

a receiver, configured to receive a service packet, wherein the service packet comprises a user identifier and IP 5-tuple information, or comprises a user identifier, IP 5-tuple information, and a service type identifier, wherein the IP 5-tuple information comprises information about a source IP address, a destination IP address, a source port, a destination port, and a communications protocol;

a processor, configured to, after performing corresponding service processing on the service packet, query a service path table for a target service processing path corresponding to the user identifier and the 5-tuple information, or query a service path table for a target service processing path corresponding to the user identifier, the 5-tuple information, and the service type identifier, wherein the target service processing path comprises information about at least one service execution entity, and each service execution entity performs one type of service processing on the service packet;

a sender, configured to send a packet that has undergone the service processing performed by the processor to a next-hop service execution entity in the target service processing path for corresponding service processing;

wherein the service path table comprises a level-1 service path table and a level-2 service path table, wherein the level-1 service path table comprises a plurality of first service processing paths and the level-2 service path table comprises a plurality of second service processing paths;

the first service processing path comprises information about a service execution entity performing L4 processing on the service packet, and an identifier indicating whether to perform L7 processing; and the second service processing path comprises information about a service execution entity performing L7 processing on the service packet, wherein in response to the service execution entity being the last-hop node in the first service processing path and the corresponding first service processing path comprising an identifier of performing L7 processing, the sender is configured to:

forward the service packet to a deep packet inspection service execution entity, and the deep packet inspection service execution entity performs a deep packet inspection on the service packet to parse and obtain the service type identifier of the service packet, wherein the deep packet inspection service execution entity queries the level-2 service path table for a second service processing path corresponding to the user identifier, the 5-tuple information, and the service type identifier, wherein the corresponding first service processing path and the corresponding second service processing path are the target service processing paths.

11. The service execution entity according to claim 10, wherein, in response to the service execution entity being comprised in the first service processing path, the processor is configured to query the level-1 service path table for a first service processing path corresponding to the user identifier and the 5-tuple information.

12. The service execution entity according to claim 11, wherein, in response to the corresponding first service processing path comprising an identifier of skipping performing L7 processing, the corresponding first service processing path is the target service processing path.

* * * * *